United States Patent
Shen et al.

(10) Patent No.: US 9,871,376 B2
(45) Date of Patent: Jan. 16, 2018

(54) TIME BASED GLOBAL OPTIMIZATION DISPATCHING METHOD

(71) Applicants: JIANGSU NANJING POWER SUPPLY COMPANY, Jiangsu (CN); NARI TECHNOLOGY DEVELOPMENT LIMITED COMPANY, Jiangsu (CN); STATE GRID ELECTRIC POWER RESEARCH INSTITUTE, Jiangsu (CN); JIANGSU ELECTRIC POWER COMPANY, Jiangsu (CN)

(72) Inventors: Haodong Shen, Nanjing (CN); Peifeng Shen, Nanjing (CN); Tingli Chen, Nanjing (CN); Kai Chen, Nanjing (CN); Yalin Liu, Nanjing (CN); Hong Zhu, Nanjing (CN); Junjing Zhang, Nanjing (CN); Jing Xiao, Nanjing (CN); Hongwei Du, Nanjing (CN); Tao Han, Nanjing (CN); Wenlu Ji, Nanjing (CN); Xing Luo, Nanjing (CN); Wen Lu, Nanjing (CN); Lin Wu, Nanjing (CN); Rina Saqi, Nanjing (CN)

(73) Assignees: JIANGSU ELECTRIC POWER COMPANY NANJING POWER SUPPLY COMPANY; NIANRI Technology Development Limited Company, State Grid Electric Power Research Institute, Beijing (CN); JIANGSU ELECTRIC POWER COMPANY, State Grid Corporation of China, Nanjing (CN)

( * ) Notice: Subject to any disclaimer, the term of this patent is extended or adjusted under 35 U.S.C. 154(b) by 302 days.

(21) Appl. No.: 14/647,801

(22) PCT Filed: Jun. 10, 2014

(86) PCT No.: PCT/CN2014/079574
§ 371 (c)(1),
(2) Date: May 27, 2015

(87) PCT Pub. No.: WO2015/039464
PCT Pub. Date: Mar. 26, 2015

(65) Prior Publication Data
US 2015/0311710 A1 Oct. 29, 2015

(30) Foreign Application Priority Data
Sep. 18, 2013 (CN) .......................... 2013 1 0425958

(51) Int. Cl.
*H02J 3/00* (2006.01)
*G06Q 10/04* (2012.01)
*G05B 13/02* (2006.01)

(52) U.S. Cl.
CPC .............. *H02J 3/00* (2013.01); *G05B 13/021* (2013.01); *G06Q 10/04* (2013.01); *H02J 3/006* (2013.01);
(Continued)

(58) Field of Classification Search
CPC ................ G05D 11/00; H02J 2003/007; H02J 2003/003
See application file for complete search history.

(56) References Cited

U.S. PATENT DOCUMENTS

7,873,442 B2 * 1/2011 Tsui .................. H02J 3/008
700/291
2004/0257059 A1 * 12/2004 Mansingh ................. H02J 3/00
324/76.11

(Continued)

OTHER PUBLICATIONS

Ali Bidram and Ali Davoudi, Hierarchical Structure of Microgrids Control System, IEEE Transactions on Smart Grid, vol. 3, No. 4, Dec. 2012.*

(Continued)

Primary Examiner — Robert Fennema
Assistant Examiner — Rajendra Khadka
(74) Attorney, Agent, or Firm — Treasure IP Group, LLC (57) ABSTRACT

The invention provides a global optimization and dispatching method based on time scales. The method uses a target value system and a dispatch model. The global optimization and dispatching method takes input from the results from a variety of subtopics. The methods provide adjustment and optimization in accordance with the time scales that are given in the sub goal of each sub topic: long-term, mid-long-term, short-term, ultra short term and real time optimization. Smart distribution grid can improve operational efficiency, integrated application of new elements in the distribution network of distribution energy network, micro grid, energy storage device and non-linear loads. This invention is fully adapted to the smart grid trends, with a good prospective.

5 Claims, 4 Drawing Sheets

(52) U.S. Cl.
CPC .......... *H02J 2003/007* (2013.01); *Y02E 60/76* (2013.01); *Y04S 10/525* (2013.01); *Y04S 40/22* (2013.01)

(56) References Cited

U.S. PATENT DOCUMENTS

| | | | | |
|---|---|---|---|---|
| 2009/0187344 A1* | 7/2009 | Brancaccio | ........ | G01R 19/2513 702/4 |
| 2010/0179704 A1* | 7/2010 | Ozog | ............... | G06Q 10/06315 700/291 |
| 2011/0071693 A1* | 3/2011 | Sun | ................... | G06F 17/30557 700/291 |
| 2011/0082597 A1* | 4/2011 | Meagher | ................... | H02J 3/38 700/291 |
| 2012/0143385 A1* | 6/2012 | Goldsmith | ................ | H02J 3/38 700/297 |
| 2013/0079939 A1* | 3/2013 | Darden, II | ........... | G06Q 10/063 700/291 |

OTHER PUBLICATIONS

H.M. Al-Hamadi and S.A. Soliman, Long-term/mid-term electric load forecasting based on short-term correlation and annual growth, Oct. 26, 2004, Power System Research Group, Department of Electrical Engineering, College of Engineering, University of Qatar, P.O. Box 2713, Doha, Qatar.*
C. Xia et al. Short, medium and long term load forecasting model and virtual load forecaster based on radial basis function neural networks, Jan. 28, 2010, Electrical Power and Energy Systems 32, 743-750.*
M.R. AlRashidi, K.M. El-Naggar, Long term electric load forecasting based on particle swarm optimization, Applied Energy 87 (2010), p. 320-326.*
Shaobo Zhong, Application of Particle Swarm Optimization Algorithm based on Classification Strategies to Grid Task Scheduling, Journal of Software, vol. 7, No. 1, Jan. 2012.*

* cited by examiner

TIME BASED GLOBAL OPTIMIZATION DISPATCHING METHOD

CROSS REFERENCE TO RELATED APPLICATION

This application claims priority to, PCT application PCT/CN2014/079574, filed on Jun. 10, 2014, which in turn takes priority from a Chinese application 201310425958.0, filed Sep. 18, 2013. The PCT application and the Chinese application are incorporated herein by reference in their entireties.

THE TECHNICAL FIELD

The present invention relates to the field of smart grid technologies, in particular to a time based global distribution network optimization scheduling or dispatching method.

THE TECHNICAL BACKGROUND

We know that the distribution network is at the end of a power system, directed to power users, is responsible for the distribution of power. It is an important task of customer service to the users. The power industry affects the national economy and people's lives. Adequate power supply is an economic development, a power production and distribution is critical to people's daily life, therefore power distribution network must meet the needs of users by setting reasonable operating control methods.

In recent years, the development of automated power distribution, one time power device, smart power distribution terminals and distribution automation system domestically, has to some extend improved the reliability of the power distribution network and solved the problem of reliable power supply distribution. However due to long-term negligence in building a distribution network, compare the operating efficiency of distribution network and transmission network, the technical performance of the distribution network is low, and the existing equipment utilization rate is also very low. There is a huge difference between load peak and load valley, and city planning and network planning also are not synchronized. Currently, the line loss rate is high, and distribution equipment capacity does not fit in with the system or is unreasonable equipped with the system, equipment maintenance workload is high. Other issues are also present. Smart Grid is the current trend of the development of domestic and international power grid, and smart distribution network is an important part of the development of the smart grid. Smart distribution grid with a scientific economic distribution network, supporting distributed power and energy storage components, providing economical and steady power supply to ensure reliable economical device management. Integration and construction, operation and management capabilities are essential features of a smart and efficient operation of the distribution network. The efficient operation of smart distribution network has become an important direction of development, and with the steady progress in the development of the smart grid, smart distribution grid can be used to optimize operating efficiency of the distribution network. It has become an important goal and urgent need to use smart grid to construct an efficient power distribution system.

Traditional operator experience-based scheduling and planning has difficulties to fully consider all factors that take place in a safe operation of a power system. Especially the traditional method lacks a comprehensive analysis of the complex scheduling period within the safe operation of the power grid. It undermines the ability of using planning to guide production. It is unable to adapt power control and scheduling capabilities to enhance economic integrations, which are needed for security management. Therefore, there is an urgent need for research to develop a global distribution network optimization scheduling method, to use dispatching global optimization method to improve operational efficiency of a smart distribution grid, and to provide an integrated application distribution of new elements in the grid network including distributed energy/micro-grid/energy storage/non-linear loads, etc., to meet the development trend for smart grid research objectives. However, the existing distribution network scheduling system in the smart distribution grid cannot satisfy the need of the development of the smart distribution network. Compared to the traditional distribution network, the smart distribution network requires a lot more in operation safety, reliability, operation economy and quality of delivery. With the coordination with the grid operation command center, and distribution network adjustment needs to be upgraded to a smart grid scheduling distribution network in order to enhance the ability to control the distribution network and optimize the allocation of resources for adjustable features of the distributed power. Since the load and load diversity cause a spatial distribution of the random variations, there are also environmental impact properties need to be considered, and the global launch of smart grid research is increasingly needed to optimize power distribution scheduling method.

SUMMARY OF THE INVENTION

The technical problem solved by the present invention is that the existing distribution network cannot meet the scheduling requirements of smart distribution grid development issues. The present invention provides a time scale based global distribution network optimization scheduling method, which can improve the efficiency of smart distribution grid. The integrated application of distributed energy distribution network, micro-grid, energy storage devices, new element of power grid such as nonlinear load provided by the present invention, can fully meet the development trend of a smart grid, and has good application prospects. The technical solutions employed in the invention are the following; An optimal scheduling method based on the time scale of the global distribution network, which is characterized in that: an value based distribution network and a scheduling method, to perform global distribution network optimization, and in accordance with the time scales, respectively, to the long-term, mid-long-term, short-term, ultra-short term and real-time optimization of the sub-goal adjustments, which comprises the following steps.

Step (1), the establishment of a global distribution grid optimization goal hierarchy diagram, and global optimization goal for modeling, to obtain the total target model with global optimization of the grid;

Step (2), the overall objective of the model therein will be equipped with a global grid optimization, according to the long-term, mid to long-term, short-term, ultra-short-term and real time, five time scales, and is divided into five sub-goal specific optimization;

Step (3), according to the sub-goal of each optimization, together with the distribution network scheduling plan in the library, select corresponding optimization strategies for each sub-goal optimization in order to achieve power, network, load interactive collaborative scheduling.

Based on the foregoing, the global time scale distribution network optimization scheduling method comprises the steps of: (I) global optimization method for modeling the target, (1) to determine the global distribution network optimization value objectives;
(2) to establish of the global optimization target value structure;
(3) to calculate value weights by analyzing hierarchical optimization process;
(4) to set up a scoring criteria for the target value(s);
(5) to calculate a score for each target value according to the scoring criteria in (4) and the calculation of value weight;
(6) to obtain an overall objective of global optimization model of distribution network, according to the result scoring structure of the target value structure.

The distribution network mentioned above optimizes scheduling method based on time scale, characterized in that in step (2), a long-term goal is for annual and quarterly, a mid-long-term goal is for monthly, short-term goal is for daily, ultra short goal is for the hourly, real-time goal is for the minutes and seconds.

Additionally, the global distribution grid optimization scheduling method is based on the time scales, characterized in step (2): According to the long-term, mid-long-term, short-term, ultra-short-term and real time, five time scales, it is divided into five sub-optimization goals;

The sub-optimization goals correspond to the long-term optimization includes load factors, the difference between peak and valley in a load, and reduction in the maximum value of peak load and line loss;

The sub-optimization goals correspond to the mid-long term optimization include load factors, the difference between peak and valley in a load, and reduction in the maximum value of peak load and line loss The sub-optimization goals correspond to the short-term optimization include load factors, load balancing, the difference between peak and valley in a load, and reduction in the maximum value of load peak;

The sub-optimization goals correspond to the ultra-short term optimization includes to reliably supply power to importance users and the device reload rate;

The sub-optimization goals correspond to real-time optimization include to reliably supply power to important users and reduce the number of households experiencing power loss during a power outage.

The aforementioned time based global distribution grid optimization scheduling method, characterized in that in step (3) in the scheduling policy library for the distribution network, select a corresponding optimization strategy direct to the sub-optimization goals and adjust accordingly. Those adjustments include: to transfer load, to adjust devices placement in accordance with their seasonal usage efficiency, to use ordered electricity, to consider electricity price, to provide energy efficient management for big users, to provide equipment and grid transformation, to have reasonable arrangements for power outage, to use complementary load transfer network, to perform load transfer to avoid peak, to perform economic operation of the distribution network, to use complementary load transfer networks, and to use distributed power and ordered electricity to achieve peak value reduction.

The beneficial effects of the present invention are the follows. A time based optimal scheduling method for a global distribution network, can improve operating efficiency of a smart distribution network, have integrated application of distributed energy, distribution network, micro-grid, energy storage devices, new grid elements such as a non-linear grid load, to fully meet the development trend of the smart grid, and has good application prospective.

DETAIL DESCRIPTION OF EMBODIMENTS

The following is for further description of the invention, in combination of the drawings.

Figure 1:
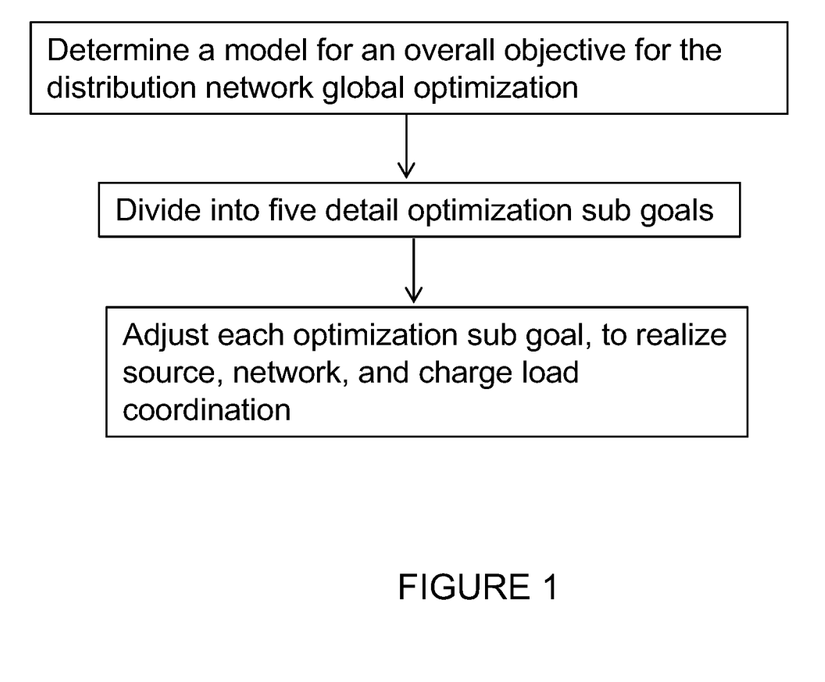
FIG. 1 is a flow-chart of the global distribution network optimization scheduling method based on time scales, in accordance with the aspects of the present invention.

As shown in FIG. 1, the distribution network global optimization scheduling method is based on time scales, according to a value structure and distribution network scheduling model, it performs global grid optimization. In accordance with the time scale, adjustment to the long-term, mid-long-term, short-term, ultra-short term and real-time optimization are made. The method includes the following steps.

Step (1), establish a global distribution grid optimization goal hierarchy diagram, and build a model toward the global optimization goal, obtain a comprehensive target model for global optimization. The detail steps are the following.

Figure 2:
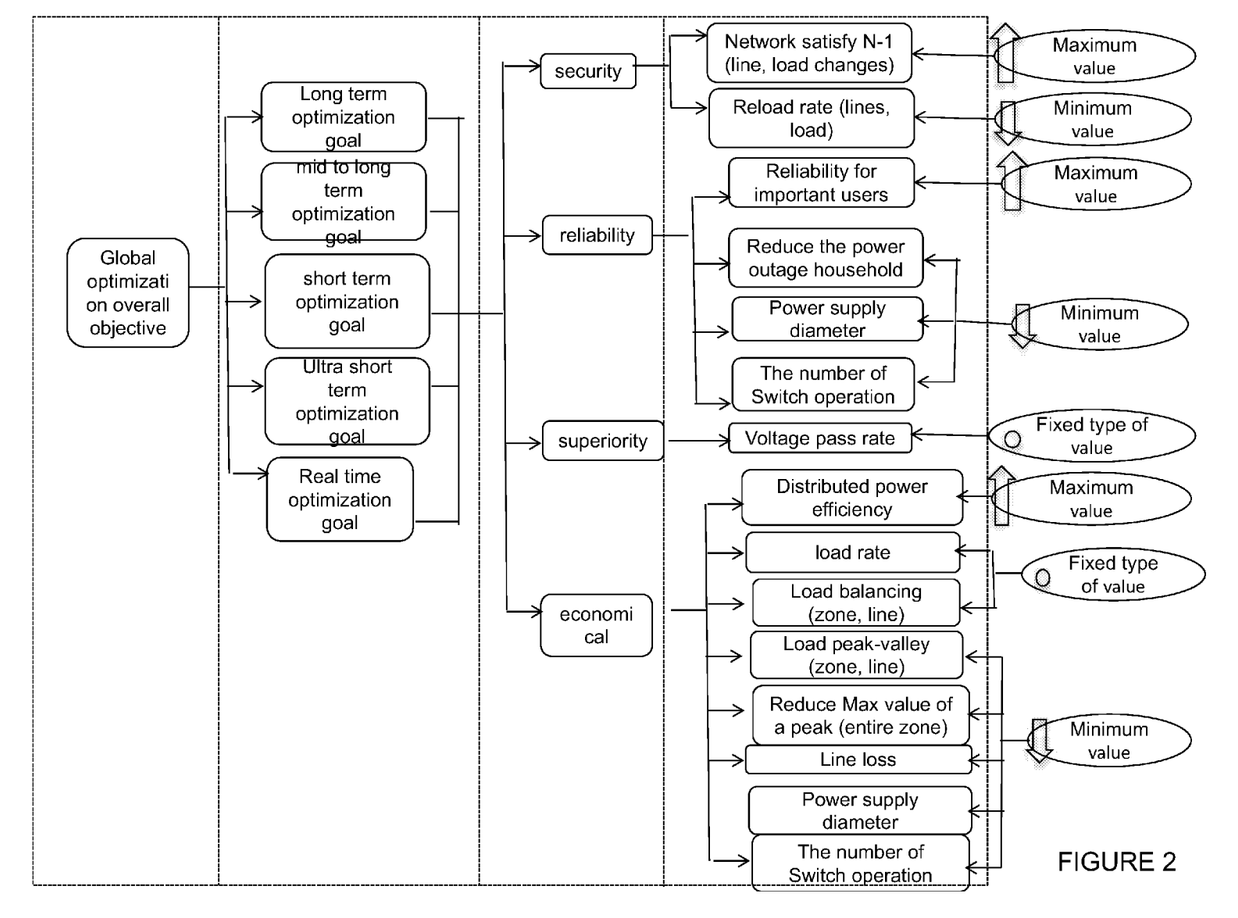
FIG. 2 is an establishment of an value structure diagram to optimize a global target, in accordance with the aspects of the present invention.

(1) to determine value targets for the global optimization of the distributed network;
(2) to establish an value structure of the global optimization goals, as shown in FIG. 2, including four layers. The first layer is a global optimization goal. The second layer is sub-optimization goals which further includes long-term optimization goals, mid-long-term optimization goals, short-term optimization goals, ultra short-term optimization goals and real-time optimization goals. The third layer is to optimize the performance, including safety, reliability, quality and economy of the power distribution network. The fourth layer is to optimize the performance of specific optimization sub-goals, which corresponds to optimize network security to meet the N−1, to optimize the device reload rate; provide optimal safety to users to have power supply reliability, low power outage households, optimize power supply radius, optimize the quality of the corresponding voltage pass rate; decrease the maximum value of the load peak and peak/valley difference in a load, optimizing line loss, power supply radius optimization, optimize load factor, optimize load balancing, optimization of distributed power generation efficiency, optimizing the number of switching operation;
(3) the overall value weight is calculated using the analytic hierarchy process, AHP (Analytic Hierarchy Process, AHP) is published by professor T. L. Saaty, of operations research, who is a professor at the University of Pittsburgh, in US;
(4) to set scoring criteria for global optimization goal;
(5) to calculate scores for the global optimization target value structure based on the global optimization value weight and the scoring criteria in (4);

(6) to obtain an overall objective of global optimization model of distribution network, according to the result scoring structure of the target value structure Step (2), the total target model for global optimization distribution network, is divided to long-term, mid-long-term, short-term, ultra-short-term and real time five time scales and hence five sub optimization specific goals. Wherein the long-term goals are for the year or quarter, mid-long-term goals are for the monthly, short-term goals are for the daily, ultra-short-term goals are for small periods of a day, and real-time goals are for the minutes and seconds.

Optimization sub-goals corresponding to long-term optimization accounts for major economic optimization goals, including load rate, load peak valley difference, reduction in the maximum value of a peak load and line loss, the load rate is a constant type value, other optimization sub goals besides load rate is aimed to achieve their minimum value.

Optimization sub-goals corresponding to mid-long-term optimization accounts for a major economic optimization goals, including load rate, load peak valley difference, reduction in the maximum value of the peak load and line loss, the load rate is fixed type value, other optimization sub goals besides load rate is aimed to achieve theft minimum value.

Optimization sub-goals corresponding to short-term optimization accounts for a major economic optimization goals, including the load rate, load balancing, bad peak valley difference and reduce the value of maximum peak load. The load rate and the load peak valley difference is a fixed type value, with the load peak valley difference and the reduced maximum peak load is aimed to achieve their minimal value.

Optimization sub-goals corresponding to ultra-short-term optimization are for security, reliability, including to supply steady power for important users and to improve device reload rate. It is aimed for important users to receive the highest reliability value, for users using extremely heavy-duty equipment, experience the least power shortage.

Optimization sub-goals corresponding to real-time optimization include to supply reliable powers to important users and to reduce the number of households who experience power loss during a power outage. It is important for users to receive highest reliability value, while reducing the number of households experiencing power outage to the least value.

Step (3), according to each optimization sub-goal, in the scheduling policy library for the distribution network, select a corresponding optimization strategy direct to the sub-optimization goals and adjust accordingly. Those adjustments included: to transfer load, to adjust devices placement in accordance with their seasonal usage efficiency, to use ordered electricity, to consider electricity price, to provide energy efficiency management for big users, to provide equipment and grid transformation, to have reasonable arrangements for power outage, to use complementary nature of the load transfer network, to perform load transfer to avoid peak, to give economic operation of the distribution network, to use complementary load transfer networks, and to use distributed power and ordered electricity to achieve peak value reduction.

Figure 3:
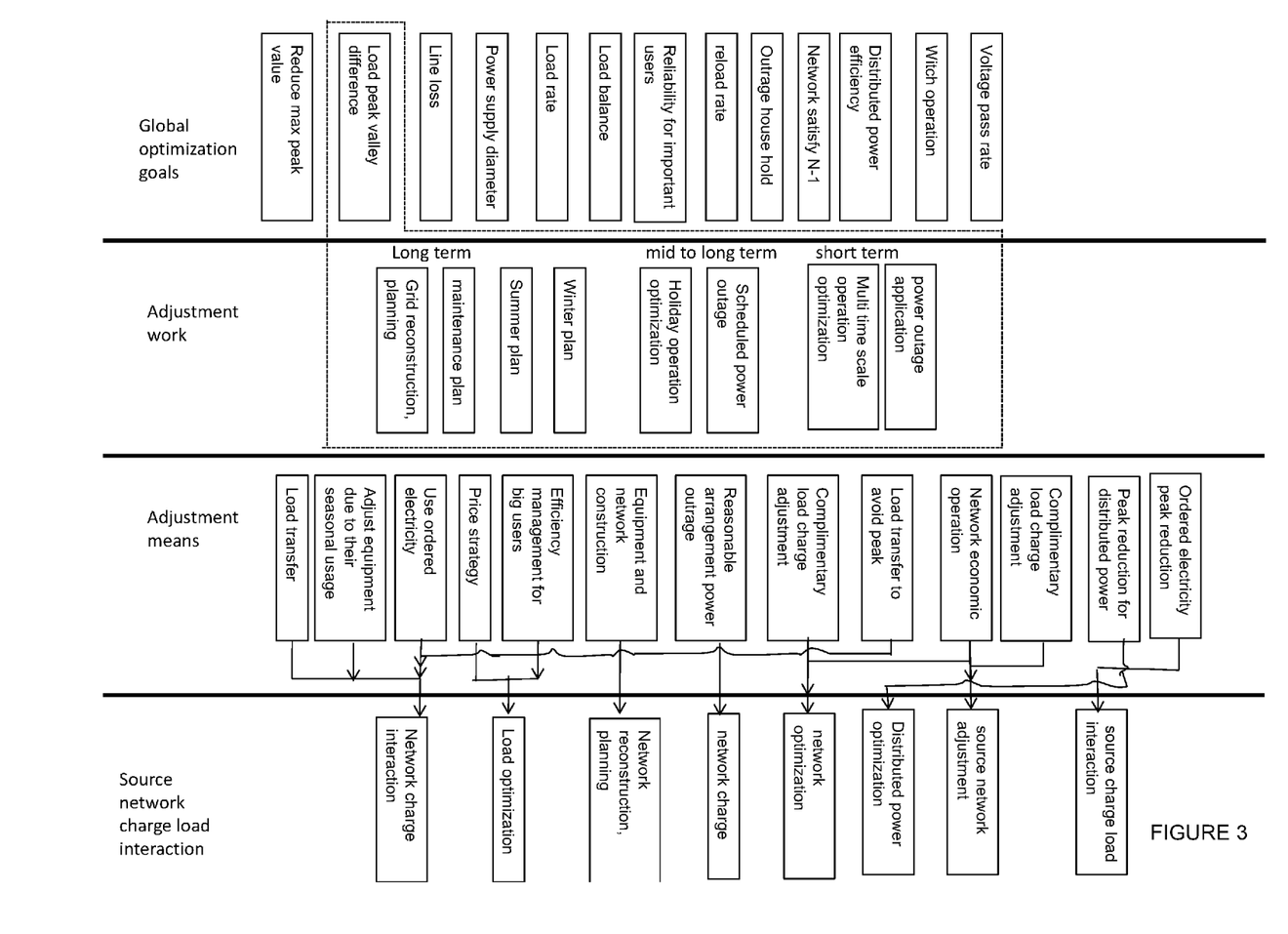
FIG. 3 is a block diagram of an embodiment, in accordance with the aspects of the present invention.

As shown in FIG. 3, an embodiment of the time based global optimization scheduling method for a distributed power network is illustrated.
  (1) Build a model for the distributed network global optimization overall objective including reducing the maximum value of the peak load, optimizing the difference between load peak and load valley, optimizing line loss, optimizing power supply radius, optimizing the load rate, optimizing load balancing, optimizing reliability to supply to important users, optimizing device reload rate, optimizing power outage households, optimizing network to meet the N−1, optimizing the distributed power generation efficiency, optimizing frequency switching operation, optimizing the voltage passage rate;
  (2) The overall objective of the global distribution network optimization model, according to the long-term, mid-long-term, short-term, ultra-short-term and real-time, five time scales, is divided into five time specific optimization sub-goals, such as the long-term optimization of sub-goals, including maintenance planning, summer peak seasons, winter peak seasons; the mid-long-term goal of optimization include optimization towards holidays, planned outage; short-term goals of optimization include optimization for operation at multiple periods.
  (3) According to each optimization sub-goal, in the scheduling policy library for the distribution network, select a corresponding optimization strategy direct to the sub-optimization goals and adjust accordingly. Those adjustments included: to transfer load, to adjust devices placement in accordance with their seasonal use efficiency, to use ordered electricity, to consider electricity price, to provide energy efficiency management for big users, to provide equipment and grid transformation, to have reasonable arrangements for power outage, to use complementary nature of the load transfer network, to perform load transfer to avoid peak, to give economic operation of the distribution network, to use complementary nature of the load transfer networks, and to use distributed power and ordered electricity achieve peak value reduction. Wherein the load transfer, devices placement in accordance with their seasonal usage efficiency, ordered electricity use can avoid load peak and realize network load interaction; price strategy, energy management for large users can achieve optimal load. Equipment and grid modification can accomplish grid transformation plan. Scheduled outage plan can be implemented for network source charge interaction. The complementary load can be used to adjust network, to ensure network's economic running. The complementary nature of the load transfer network used to implement network optimization. Peak reduction in distributed power network is implemented to achieve distributed power optimization, source network coordination. Electricity is orderly used to achieve peak value reduction and power source load interaction.

The time based distribution network global optimization dispatching method is accomplished through dispatching software. The global optimization dispatching software is deployed on the optimization analysis server in distribution network optimization scheduling system. Global optimization dispatching software uses database server in functional calculation, and the database server is supported by distribution automation management system and the database of the network optimization dispatch system.

The history/SCADA server requires real-time and historical data information from distribution automation management system and the distribution network optimization scheduling system. The information is collected through a pre acquisition server. The global optimization scheduling software system needs to interact with other systems' integration server, interact with other systems in security zone III, in order to calculate using other systems' data information. Meanwhile, the global optimization scheduling software needs to interact with the micro-grid scheduling controller, new energy intelligent control equipment, a variety of intelligent load management devices and other terminal equipment, in order to achieve real-time control among the network, source, and charge.

Figure 4:
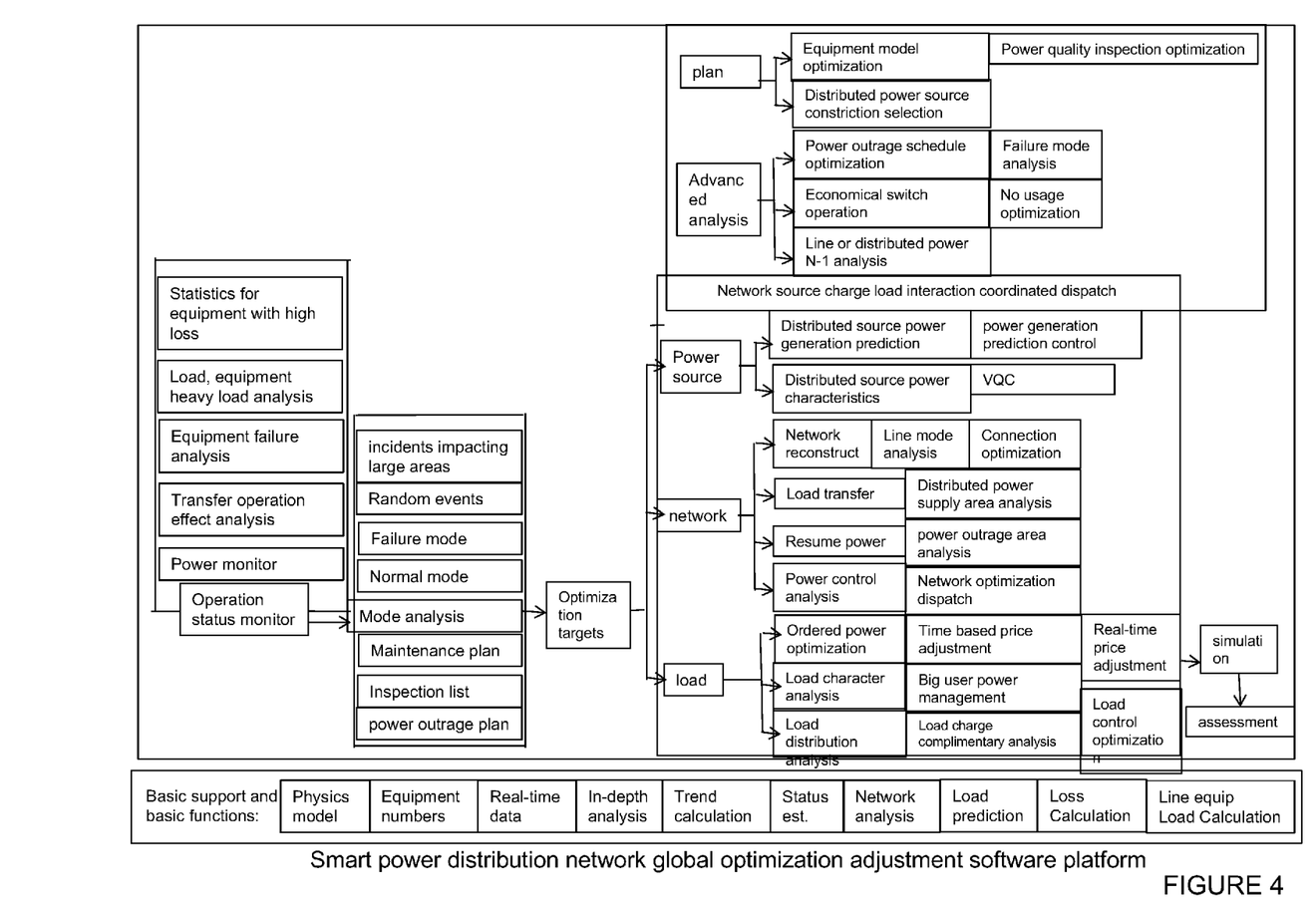
FIG. 4 is a structure diagram for the global optimization scheduling method, in accordance with the aspects of the present invention.

As shown in FIG. 4, the present invention is based on a global optimization scheduling software and using a structure of scheduling software for the architecture of system operation. The global optimization scheduling system is composed of a hardware layer, an operating system layer, a supporting platform and a software layer of four hierarchical structures, wherein, the hardware layer, the operating system layer and the support platform layer are shared with the original master distribution automation systems.

Software layer includes three types: basic support type of software, application type of software and advanced application type of software. They are integrated in and supported by the bus, a data bus and public servers to support the complete functionalization of the application. The three types of software layers are organically linked together, and become one integral system.

The functions of the software layer have basic support type of software, including physical models, device parameters, real-time data, power flow calculation, state estimation, network analysis, load forecasting, line loss calculation, circuit, equipment load calculation and other functions.

The application types of software include network reconfiguration, wiring pattern analysis, contact point optimization, load transfer, distributed power supply range analysis, restoration of power supply, power cut scope analysis, power supply capacity analysis, network optimization scheduling, orderly power optimization, price optimization for separate time electricity using, real-time price optimization, load control optimization, large user energy management, load characteristics analysis, load complementary analysis, analysis of load distribution, distributed power generation forecasting, analysis of distributed power generation characteristics, power plant monitoring, VQC, high loss device statistics, circuit, equipment heavy loading analysis, equipment failure analysis and statistics, scheduling operations impact analysis, voltage monitoring and other functions.

Advanced application type of software includes outage planning and scheduling optimization, economic analysis about switching operation, non-return power optimization, failure mode analysis, distribution transformer line or N−1 analysis, optimization line equipment, power quality detection point optimization, and construction of point detection in the distributed power network and the like.

The above shows and describes the main characteristics and advantages and the basic principle of the invention. However, the technical personnel in the industry should know that, the invention is not subject to the restrictions of embodiment described, the embodiment and the description illustrate the principle of the invention, in the premise of not departing from the spirit and scope of the present invention, various changes and improvements can be made. These changes and improvements are falling within the protection scope of the present invention. The present invention requires the scope of protection by the attached dams and its equivalent definition.

The invention claimed is:

1. A method for managing a power distribution network, the method comprising:
   providing a distributed energy distribution network, microgrid, energy storage devices, and a nonlinear load;
   executing a time scale based global optimization dispatching method and a distributed network dispatching model for the power distribution network;
   performing a global distribution network global optimization in accordance with a multi-time scale optimization
   wherein the method comprises the following steps:
   a first step of establishing a global optimization target model for the power distribution network by developing a target hierarchy diagram for global optimization and building a model for a global optimization target;
   a second step of dividing an overall objective of the global optimization target model for global grid optimization into long-term, mid-long term, short-term, ultra-short-term and real-time optimization sub-goals, wherein each sub-goal includes a sub-goal adjustment;
   a third step of selecting, according to each optimization sub-goal together with distribution network dispatching policy set in a scheduling policy library, a corresponding optimization strategy to optimize the sub-goal for each adjustment, to accomplish interactive collaborative dispatching among power network and load;
   wherein the first step of the global optimization dispatching method for target modeling further comprising:
   (a) determining the global distribution network global optimization value objectives, including long term optimization goals, mid-long term optimization goals, short term optimization goals, ultra-short term optimization goals and real time optimization goals;
   (b) establishing a global optimization target value structure:
   (c) calculating global optimization target value weights by analyzing a hierarchical process;
   (d) setting up a scoring criteria for global optimization target value(s);
   (e) calculating scores, based on the calculation of global optimization target value weights for each global optimization target value according to the scoring criteria for global optimization target value(s);
   (f) obtaining an overall objective of the global optimization target model of distribution network, according to the calculated scores of the target value structure;
   wherein the third step further comprises in the scheduling policy library for the power distribution network, selecting a corresponding optimization strategy to optimize the sub-goals; and
   adjusting the power distribution network based on the selected corresponding optimization strategy, said adjusting comprises:
   transferring load, adjusting placement of devices in accordance with a seasonal usage efficiency of said devices, using ordered electricity, considering electricity price, providing energy efficiency management for users, providing equipment and grid transformation, having arrangements for power outage, using complementary nature of the load transfer network, performing load transfer to avoid peak, giving economic operation of the power distribution network, using complementary load transfer networks, and using distributed power and ordered electricity to achieve peak value reduction.

2. The method for managing the power distribution network according to claim 1, wherein the second step further comprises;
   long term optimization goals for annual and quarterly goals,
   mid-long term optimization goals for monthly goals, short-term optimization goals for previous day goals,
ultra-short term optimization goals for hourly goals of present day, and
real-time optimization goals for minute and second level goals.

3. The method for managing/optimizing the power distribution network with the second step according to claim 1 comprises long term, mid-long term, short-term, ultra-short term and real time scale optimization sub-goals wherein;
   Optimization sub-goals corresponding to long-term optimization includes load rate, load peak valley difference, reduction in the maximum value of a peak load and line loss;
   Optimization sub-goals corresponding to mid-long term optimization includes the load rate, load peak value difference, reduction in the maximum value of the peak load and line loss;
   Optimization sub-goals corresponding to short-term optimization includes the load rate, load balancing, load peak valley difference and reduce the value of maximum peak load;
   Optimization sub-goals corresponding to ultra-short term optimization include to supply steady power for important users and to improve device reload rate;
   Optimization sub-goals corresponding to real-time optimization include to supply reliable powers to important users and to reduce the number of household that experience power loss during a power outage.

4. The method for managing/optimizing the power distribution network of claim 1, wherein step (a) determining the global distribution network global optimization value objectives, includes:
   reducing the maximum value of the peak load,
   optimizing the difference between load peak and load valley,
   optimizing line loss,
   optimizing power supply radius,
   optimizing the load rate,
   optimizing load balancing,
   optimizing reliability to supply to important users,
   optimizing device reload rate,
   optimizing power outage household,
   optimizing the distributed power generation efficiency,
   optimizing frequency switching operation, and
   optimizing the voltage passage rate.

5. The method for managing/optimizing the power distribution network of claim 1, wherein the value structures comprises four layers, wherein
   a first layer is a global optimization goal;
   a second layer is sub-optimization goals which further includes long term optimization goals, mid-long term optimization goals, short-term optimization goals, ultra-short term optimization goals, and real-time optimization goals;
   a third layer is to optimize safety, reliability, and economy of the power distribution network;
   a fourth layer is to optimize performance of specific optimization sub-goals, wherein said forth layer includes;
   optimizing network security to satisfy line load changes;
   optimizing the reload rate;
   providing optimal safety to users to have power supply reliability;
   reducing power outage households,
   reducing a number of switch operation,
   optimizing voltage passage rate,
   decreasing the maximum value of the load peak and peak/valley difference in a load,
   optimizing line loss,
   optimizing power supply radius,
   optimizing load factor,
   optimizing load balancing,
   optimizing distributed power generation efficiency, and
   optimizing the number of switching operation.

* * * * *